(12) United States Patent
Alvermann et al.

(10) Patent No.: US 8,234,686 B2
(45) Date of Patent: Jul. 31, 2012

(54) SYSTEM AND METHOD FOR CREATING A SECURITY APPLICATION FOR PROGRAMMABLE CRYPTOGRAPHY MODULE

(75) Inventors: John M. Alvermann, Victor, NY (US); David D. Babich, Rochester, NY (US); William T. Black, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 2672 days.

(21) Appl. No.: 10/926,451

(22) Filed: Aug. 25, 2004

(65) Prior Publication Data
US 2006/0059537 A1 Mar. 16, 2006

(51) Int. Cl.
*H04L 9/00* (2006.01)
(52) U.S. Cl. .......... 726/1; 726/4; 713/160; 380/270
(58) Field of Classification Search ........... 726/1
See application file for complete search history.

(56) References Cited

U.S. PATENT DOCUMENTS

| | | | | |
|---|---|---|---|---|
| 4,766,519 A | 8/1988 | Heiland | ........ | 361/399 |
| 4,912,656 A | 3/1990 | Cain et al. | ........ | 364/514 |
| 4,929,480 A | 5/1990 | Midkiff et al. | ........ | 428/35.6 |
| 5,164,988 A * | 11/1992 | Matyas et al. | ........ | 713/156 |
| 5,546,397 A | 8/1996 | Mahany | ........ | 370/85.1 |
| 5,757,924 A | 5/1998 | Friedman et al. | ........ | 380/49 |
| 5,805,416 A | 9/1998 | Friend et al. | ........ | 361/686 |
| 5,832,207 A | 11/1998 | Little et al. | ........ | 395/186 |
| 5,974,142 A | 10/1999 | Heer et al. | ........ | 380/9 |
| 6,072,994 A | 6/2000 | Phillips et al. | ........ | 455/84 |
| 6,108,425 A | 8/2000 | Smith, Sr. et al. | ........ | 380/277 |
| 6,151,679 A | 11/2000 | Friedman et al. | ........ | 713/201 |
| 6,212,280 B1 | 4/2001 | Howard, Jr. et al. | ........ | 380/279 |
| 6,240,513 B1 | 5/2001 | Friedman et al. | ........ | 713/152 |
| 6,242,691 B1 | 6/2001 | Reese et al. | ........ | 174/35 R |
| 6,259,898 B1 | 7/2001 | Lewis | ........ | 455/103 |
| 6,363,488 B1 * | 3/2002 | Ginter et al. | ........ | 726/1 |
| 6,393,261 B1 | 5/2002 | Lewis | ........ | 455/103 |
| 6,442,690 B1 | 8/2002 | Howard, Jr. et al. | ........ | 713/175 |
| 6,499,110 B1 * | 12/2002 | Moses et al. | ........ | 726/1 |
| 6,700,787 B1 | 3/2004 | Beseth et al. | ........ | 361/729 |
| 6,701,338 B2 | 3/2004 | Narad et al. | ........ | 708/525 |
| 7,246,370 B2 * | 7/2007 | Valente et al. | ........ | 726/1 |
| 7,260,830 B2 * | 8/2007 | Sugimoto | ........ | 726/1 |

(Continued)

OTHER PUBLICATIONS

*Sierra II Programmable Cryptographic Module*, Harris Corporation, 2003.

(Continued)

*Primary Examiner* — Jason K. Gee
*Assistant Examiner* — Yonas Bayou
(74) *Attorney, Agent, or Firm* — Allen, Dyer, Doppelt, Milbrath & Gilchrist, P.A.

(57) ABSTRACT

A system and method of the present invention creates a security application for a programmable cryptography module, which includes a security policy software module and mirror security policy data structures. A processor determines a security policy for an implementation specific application as a set of rules governing cryptographic security policy functions of the security policy software module. The processor is operative for generating a binary security policy file representative of the security policy and comparing the binary security policy file with the mirror security policy data structures to determine a violation of the security policy or a successful comparison.

52 Claims, 13 Drawing Sheets

U.S. PATENT DOCUMENTS

| | | | |
|---|---|---|---|
| 2002/0094087 A1 | 7/2002 | Dellmo et al. | 380/270 |
| 2002/0095594 A1 | 7/2002 | Dellmo et al. | 713/200 |
| 2003/0074579 A1* | 4/2003 | Della-Libera et al. | 713/200 |
| 2003/0120955 A1* | 6/2003 | Bartal et al. | 713/201 |
| 2004/0059946 A1* | 3/2004 | Price | 713/201 |
| 2004/0088583 A1 | 5/2004 | Yoon et al. | 713/201 |
| 2004/0123137 A1 | 6/2004 | Yodaiken | 713/200 |
| 2004/0148514 A1* | 7/2004 | Fee et al. | 713/200 |
| 2004/0158720 A1 | 8/2004 | O'Brien | 713/176 |
| 2005/0036622 A1* | 2/2005 | Hay et al. | 380/270 |
| 2005/0125657 A1* | 6/2005 | Haight | 713/160 |
| 2006/0059537 A1* | 3/2006 | Alvermann et al. | 726/1 |

OTHER PUBLICATIONS

Ying, *Key Hopping—A Security Enhancement Scheme for IEEE 802.11 WEP Standards*, NextComm, Inc., Feb. 2002.

*TACLANE Encryptor (KG-175)*, General Dynamics C4 Systems, 2004.

Johnson, *TACLANE's Role in Information Assurance*, article available at www.chips.navy.mil/archives/02_summer/authors/index2_files/taclane.htm.

*Access Point, Bridge & Repeater with Integrated 15dB Antenna*, Gentek Marketing, 2002.

\* cited by examiner

CONFIGURATION TABLE — 90
- 92a: GENERATE TABLE
- 92b: LOST LAST TABLE
- 94, 96

Tabs: AUTOMATION ALGORITHM | INTEGRITY ALGORITHM | KEY TYPES
NEW VALUES | ALARM ACTIONS | MODES Numbered tabs: 0, 1, 2, 3, 8, 9, 10, 11, 4, 5, 6, 7

- SAVILLLE — ALGORITHM
- DISSABLE
- 76K BPS — DATA BASE
- NONE
- KY57 — MODE
- MESSAGE VOLUME MEASUREMENT DATA VALIDATION
- FFFF — MAX TITLE HEAD BYPASS SIZE
- HEADER — DATA LABELING
- FALSE — REKEY CAPABILITY
- SECRET — CLASSIFICATION LEVEL

SRC DEST COMBINATIONS
- ☑ RED TO BLACK
- ☑ BLACK TO RED
- ☐ RED TO RED
- ☐ BLACK TO BLACK

SHORT PERIOD: 0000000.00
LONG PERIOD: 0000000.00

FIG. 5

SYSTEM AND METHOD FOR CREATING A SECURITY APPLICATION FOR PROGRAMMABLE CRYPTOGRAPHY MODULE

FIELD OF THE INVENTION

The present invention relates to the field of communications networks, and more particularly, to a system and method for creating a security application for use in a cryptography device used in communications networks and related methods.

BACKGROUND OF THE INVENTION

Security is an extremely important consideration in network communications. With the ever-increasing utilization of the Internet, most networks now have Internet gateways that open the network to external attacks by would-be hackers. Further, the popularity of wireless networks has also increased dramatically as technology has enabled faster and more reliable wireless communications. Yet, wireless communications are inherently less secure than wired communications, since wireless communication signals are typically much easier to intercept than signals on difficult-to-access cables.

As a result, cryptography modules are often used to encrypt private or secret communications and reduce the likelihood that they will be deciphered and used by malicious individuals or organizations. By way of example, wireless local area networks (WLANs) and WLAN devices are widely used and provide a convenient and cost-effective approach for implementing network communications where it may be difficult or otherwise impractical to run cables. One of the more prominent standards which has been developed for regulating communications within WLANs is promulgated by the Institute of Electrical and Electronic Engineers' (IEEE) 802 LAN/MAN Standards Committee, including the 802.11 standard. In addition to providing wireless communications protocols, the 802.11 standard also defines a wireless equivalent privacy (WEP) cryptographic algorithm used to protect wireless signals from eavesdropping.

The programmable cryptography modules have been developed for use in such cryptography systems. The Sierra and Sierra II programmable cryptographic modules are manufactured and sold by the assignee of the present invention, Harris Corporation of Melbourne, Fla. The Sierra and Sierra II are both programmable cryptographic modules operative as both a multimedia voice and data encryption module. Both modules are miniaturized printing wiring assemblies that include at least one custom application specific integrated circuit (ASIC) and supporting software that is embedded in radios and other voice and data communications equipment to encrypt classified information prior to transmission and storage.

The NSA-certified Sierra modules are an embeddable encryption technology that combine the advantages of the government's high-grade security (Type I) with the cost efficiency of a reprogrammable, commercially produced Type 3 and Type 4 encryption module. Sierra can assume multiple encryption personalities depending on the mission and provide encryption/decryption functionality, digital voice processing (vocoding) and cryptographic key management support functions.

The software programmability provides a low cost migration path for future upgrades to embedded communications equipment without the logistics and cost burden normally associated with upgrading hardware. The Sierra programmable encryption module supports a large number of encryption/decryption algorithms and modes. It has a limited algorithm and mode distribution to customers by the National Security Agency (NSA). Any security policy criteria must be met within the module and approved by NSA. During development, custom module software must be created for each Sierra embedment and intensive NSA software evaluation/certification must be made for every module. Non-flexible customer algorithm updates must be reevaluated by the NSA for new algorithm additions. This increases the manpower resource costs for each embedment.

This problem is currently being solved by a custom module software for each Sierra embedment and costs the NSA software evaluation/certification for every module. The security requirements are pushed to host systems and customers are charged a high NRE. It would be advantageous, however, if the programmable cryptography modules would allow greater flexibility in the delivery of software security policies and development of software embedment packages for different custom applications. The process should be expedited with reduced time and money spent on the NSA certification process. It would also be advantageous if a system and method could be implemented that would facilitate the upgrade of waveforms and algorithms for customers and reduce NRE and manpower resource costs for each embedment.

SUMMARY OF THE INVENTION

It is therefore an object of the present invention to provide a system and method for creating security applications for a programmable cryptography module, which overcomes the drawbacks set forth above.

In accordance with the present invention, a system and method creates security applications for a programmable cryptography module, which includes a security policy software module and mirror security policy data structures that serve as a comparison for any cryptographic security policy functions of the security policy. A processor determines a security policy for an implementation specific application as a set of rules governing cryptographic security policy functions of the security policy software module. The processor is operative for generating a binary security policy file that is representative of the security policy. This file is compared with the mirror security policy data structures to determine a violation of the security policy or successful comparison.

In yet another aspect of the present invention, the programmable cryptography module includes a cryptographic system and cryptographic security policy functions that are enabled for the cryptographic system. A processor performs a signature on the cryptographic system and is operative for generating the binary security policy file representative of a security policy for an implementation specific application as a set of rules governing cryptographic security policy functions of the programmable cryptography module. The processor approves any binary security policy files, for example, such as for NSA certification, without performing again a signature on the cryptographic system.

In another aspect of the present invention, a user inputs data for generating the binary security policy file within an object distribution interface that comprises, in one aspect of the invention, a graphical user interface having tabs for selecting different cryptographic security policy functions.

These cryptographic security policy functions can be enabled after successful comparison or bypassed if a violation of the security policy has occurred. The binary security policy file is loaded into a system memory, for example, a flash memory. Data from the binary security policy file can be overlaid onto the mirror security policy data structures for a comparison.

In another aspect of the present invention, the binary security policy file comprises hexadecimal enumerations that represent data within a binary security policy file. The physical position of the data could determine an interpretation of the data for the security policy. The binary security policy file can also comprise parsed data such that its physical position determines an interpretation of the data for the security policy. The file can also include a header and checksum such that the processor, for example, a PC operative with the module, could validate the header and checksum before loading the binary security policy file into any memory, such as a flash memory of the programmable cryptography module.

BRIEF DESCRIPTION OF THE DRAWINGS

FIG. 5 is a view of a graphical user interface that can be used with the present invention.

DETAILED DESCRIPTION OF THE PREFERRED EMBODIMENTS

Figure 1:
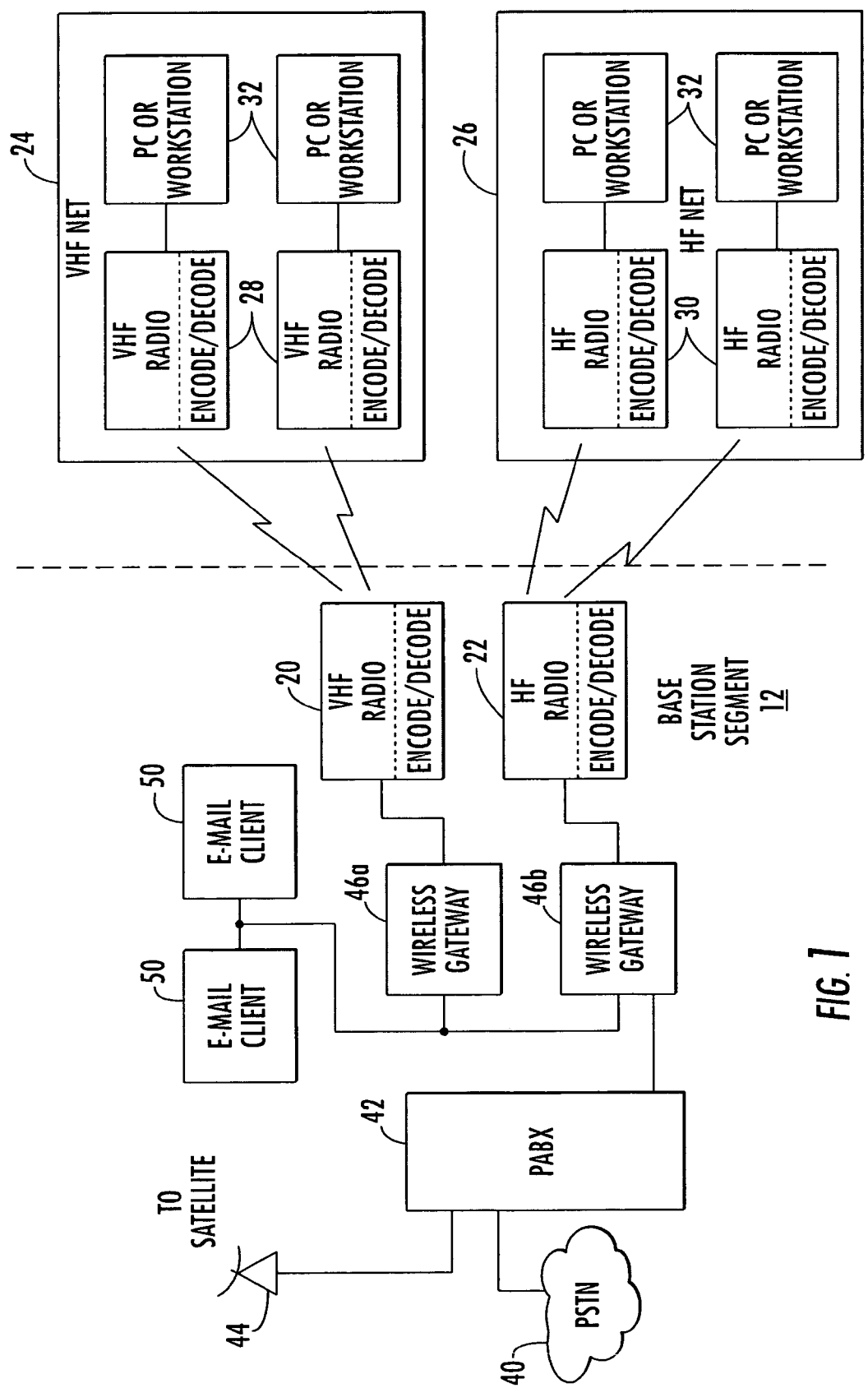
FIG. 1 is a block diagram of an example communication system that can include a programmable cryptography module that may be updated using the system and method of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The system and method of the present invention is also referred to as a Security Policy Object Distribution System (SPODS). The present invention improves the methods currently used to impose security policies for programmable cryptography modules, for example, the Sierra line of products. The present invention also improves the signature process and subsequent cryptographic verification processes in the Sierra programmable cryptography modules and similar cryptographic devices.

As programmable encryption systems continue to develop and gain popularity, the amount of time, money and human resources spent on creating code that implements the security policies must be reduced. The signature process and cryptographic verification process must also be improved.

The present invention is advantageous for use with programmable cryptography modules, for example, in one non-limiting example, the Sierra and Sierra II programmable cryptographic modules manufactured and sold by Harris Corporation in Melbourne, Fla. The Sierra and Sierra II are programmable cryptographic modules operative as both a multimedia voice and data encryption module. Both modules are miniaturized printed wiring assembly, custom designed application specific integrated circuits (ASIC), which include supporting software. The modules are embedded in radios and other voice and data communications equipment to encrypt classified information prior to transmission and storage.

The NSA-certified Sierra module is an embeddable encryption technology that combines the advantages of the government's high-grade security (Type I) with the cost efficiency of a reprogrammable, commercially produced Type 3 and Type 4 encryption module. The Sierra module can assume multiple encryption personalities depending on the mission, and provide encryption/decryption functionality, digital voice processing (vocoding) and cryptographic key management support functions.

The Sierra module's software programmability provides a low cost migration path for future upgrades to embedded communications equipment without the logistics and cost burden normally associated with upgrading hardware. The module provides a user the capability to remove the Type 1 functionality, allowing the device to be downgraded from a CCI device to an unclassified device.

The Sierra module's small size, low power and high data rates make it an ideal choice for battery sensitive applications. It is ideally suited for military radios, APCO Project 25 radios, wireless LAN's, remote sensors, guided munitions, UAV's and other equipment requiring a low power, programmable solution. The Sierra module is available today as a complete compact module or as discrete parts for custom applications. The Sierra module has been fully NSA certified and successfully embedded in multiple applications (Motorola XTS™ 5000 Radio, BAE Systems JTRS 2C Radio, Harris SecNet 11 Secure Wireless LAN, key management modules, etc.).

The Sierra II module is a second product in the Sierra family and incorporates the features of the Sierra I module. It offers data rates greater than 300 Mbps and low power consumption suitable for battery powered applications, legacy and future algorithm support and advanced programmability. It can support the requirements of the Joint Tactical Radio System (JTRS) and NSA's Crypto Modernization Program, including the requirement for programmability. The software programmability provides a low cost migration path for future upgrades to embedded communications equipment without the logistics and cost burden normally associated with upgrading hardware. These encryption modules have a small size, exhibit low power consumption, and have high data rates, making the modules an ideal choice for battery powered applications. They are especially suited for JTRS applications, military radios, wireless local area networks (LAN's), remote sensors, guided munitions, UAV's and other equipment requiring a low powered, programmable solution.

The Sierra family of modules can be used with the cluster I cryptographic module and could create embeddable security modules for a cluster V platform.

The Sierra family of encryption modules has various cryptographic and other features. They are operable with Type 1, 3 and 4 cryptographic algorithms.

Type I cryptographic algorithms include:
a) BATON/MEDLEY;
b) SAVILLE/PADSTONE;
c) KEESEE/CRAYON/WALBURN;
d) GOODSPEED;
e) ACCORDION;
f) FIREFLY/Enhanced FIREFLY; and
g) JOSEKI Decrypt.

Type 3 cryptographic algorithms include:
a) DES, Triple DES;
b) AES;
c) Digital Signature Standard (DSS); and
d) Secure Hash Algorithm (SHA).

Type 4 cryptographic algorithms include the CITADEL cryptographic engine that uses cryptographic algorithms based on a mixed-mode, arithmetic block cipher. It can provide half-duplex encryption and decryption at throughput rates up to 5 Mbps. It can process serial or parallel unencrypted [cipher text-CT)] data. Interfaces are 3.3V and 5V CMOS compatible. The algorithm can be customized.

Other algorithms can be added later. These encryption modules also have key management, which includes:
a) SARK/PARK (KY-57, KYV-5 and KG-84A/C OTAR);
b) DS-101 and DS-102 Key Fill;
c) SINCGARS Mode ⅔ Fill; and
d) Benign Key/Benign Fill.

Data rates can be up to 300 Mbps (depending on the mode), and the modules are available as ASIC and/or another module. A programmable cryptographic ASIC is available in two packages for various embedded applications. Package 1 is 280-ball µBGA (16×16 mm), and package 2 is 608-ball BGA (31×31 mm).

The operating temperature for these modules is about −40 degrees to +85 degrees C., and the supply voltage is about 1.8V (ASIC) or 3.3V (module). It has low power draw, making them especially applicable for battery powered applications. These modules are field software reprogrammable, have cryptographic bypass, and are non-CCI prior to Type 1 programming. The modules are designed to protect voice/data traffic up to TS/SCI.

The modules can be used in different applications such as: (a) all JTRS radio products (e.g., vehicular, manportable, handheld, airborne, etc.); (b) handheld and mobile law enforcement (battery powered) radios; (c) guided munitions and UAV applications; (d) telemetry and military sensor systems; (e) network interface cards and IP security products (HAIRE-compliant); (f) secure wireless networks (Harris SecNet products; (g) homeland security applications; and (h) next generation key management modules.

Figure 9:
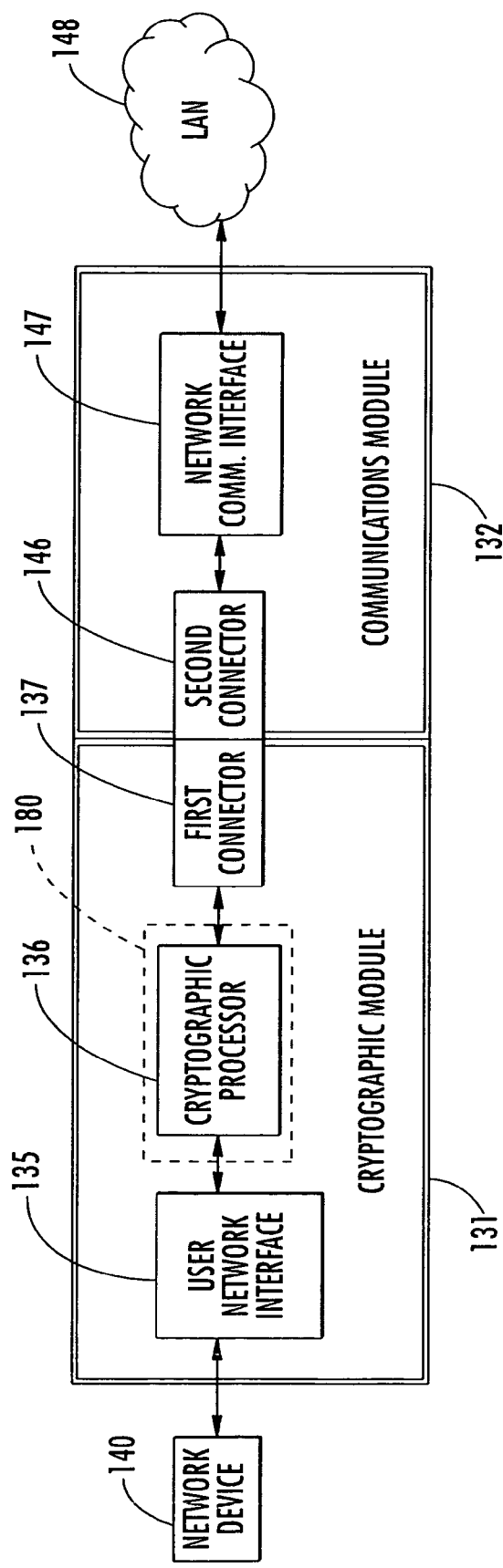
FIGS. 9-14 are schematic block diagrams illustrating in greater detail various components of the cryptographic device of FIG. 6.

An example of a cryptographic circuit that can be used with modification and upgraded by the present invention is the Sierra™ cryptography module, for example, also shown in FIG. 9 in U.S. published patent application No. 2002/0095594, the disclosure which is incorporated by reference in its entirety. The cryptography processor can be a Palisades ASIC, for example, as in the Sierra cryptography module. The cryptography circuit could include RAM and associated back-up battery and a field programmable gate array that can be programmed to produce various devices and logic blocks as appreciated by those skilled in the art.

FIG. 1 is a high level block diagram of an example communication system 10 that includes various components that could incorporate a programmable cryptographic module and used with the present invention.

The communications system 10 includes a base station segment 12 and wireless message terminals that could be modified for use with the present invention. The base station segment 12 includes a VHF radio 20 and HF radio 22 that communicate and transmit voice or data over a wireless link to a VHF net 24 or HF net 26, each which include a number of respective VHF radios 28 and HF radios 30, and personal computer workstations 32 connected to the radios 28, 30. The base station segment 12 includes a landline connection to a public switched telephone network (PSTN) 40, which connects to a PABX 42. A satellite interface 44, such as a satellite ground station, connects to the PABX 42, which connects to processors forming wireless gateways 46a, 46b. These interconnect to the VHF radio 20 or HF radio 22, respectively. The processors are connected through a local area network to the PABX 42 and e-mail clients 50.

An Ethernet/TCP-IP local area network could operate as a "radio" mail server. E-mail messages could be sent over radio links and local air networks using STANAG-5066 as second-generation protocols/waveforms (the disclosure which is hereby incorporated by reference in its entirety) and, of course, preferably with the third-generation interoperability standard: STANAG-4538. An interoperability standard FED-STD-1052 (the disclosure which is hereby incorporated by reference in its entirety) could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

Currently, many embedment applications of a Sierra based programmable encryption module as manufactured and sold by Harris Corporation or similar cryptographic modules and devices must have a corresponding custom software package. These are required because each implementation specific application (ISA) is required to have a security policy imposed on it. A security policy is a set of rules governing the cryptographic capabilities and cryptographic security policy functionality of the crypto-subsystem or "system." Each unique code package must go through a cost and time intensive signature process to approve the unique security policy for the corresponding code package.

Figure 2:
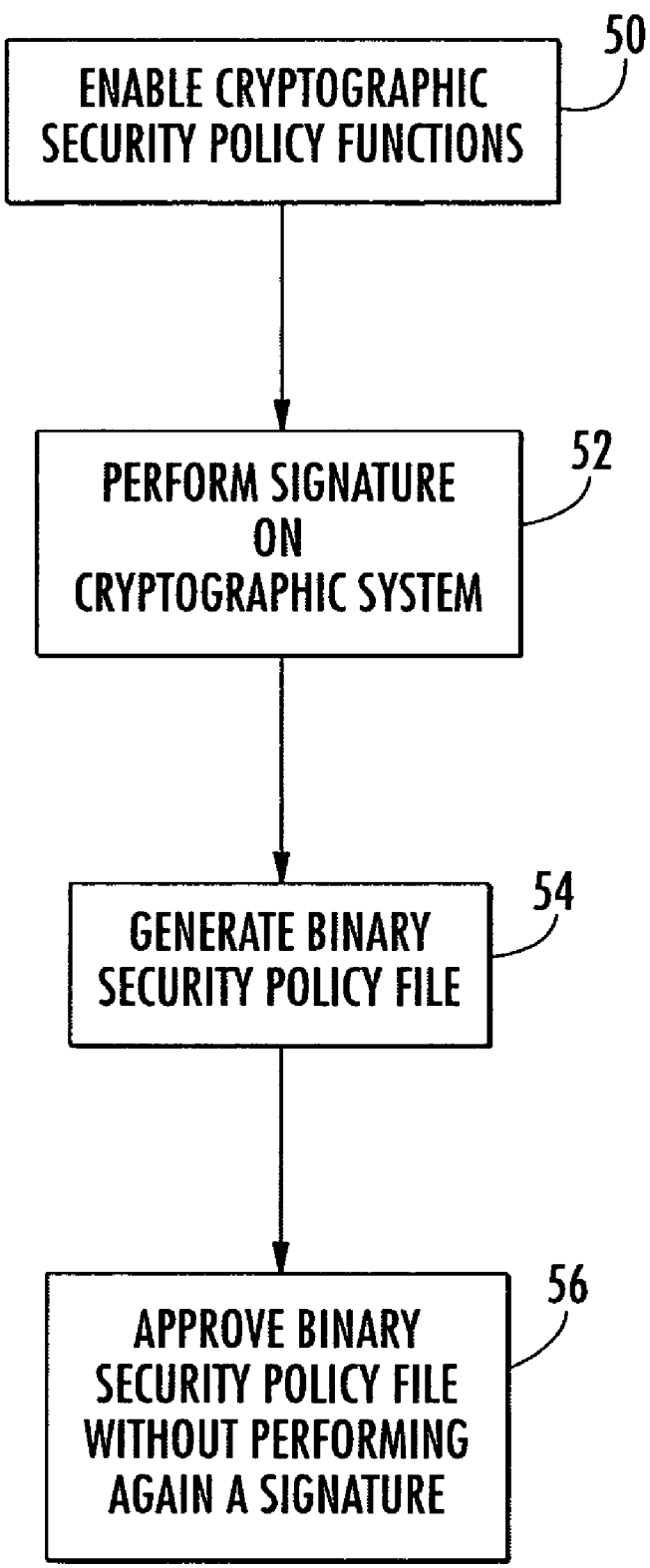
FIG. 2 is a high level flowchart showing the steps for approving a binary security policy file without performing again a signature in accordance with the present invention.

FIG. 2 is a high level flow chart that illustrates basic steps of the present invention in which cryptographic security policy functions are initially enabled (Block 50). A signature is performed on the entire cryptographic system (Block 52). This signature typically includes NSA approval. A binary security policy file is generated (Block 54) and approved without performing again a signature (Block 56). Thus, the present invention allows the creation of one code package for the programmable crypto-system that can be easily imported to many applications, while following the security policies imposed by the NSA. This reduces the manpower required to create multiple cryptographic embedment applications for the programmable cryptographic module and reduces the amount of time and money spent by any organization on the NSA signature process. With the present invention, security policy upgrades can be transferred to customers with less difficulty.

Figure 3:
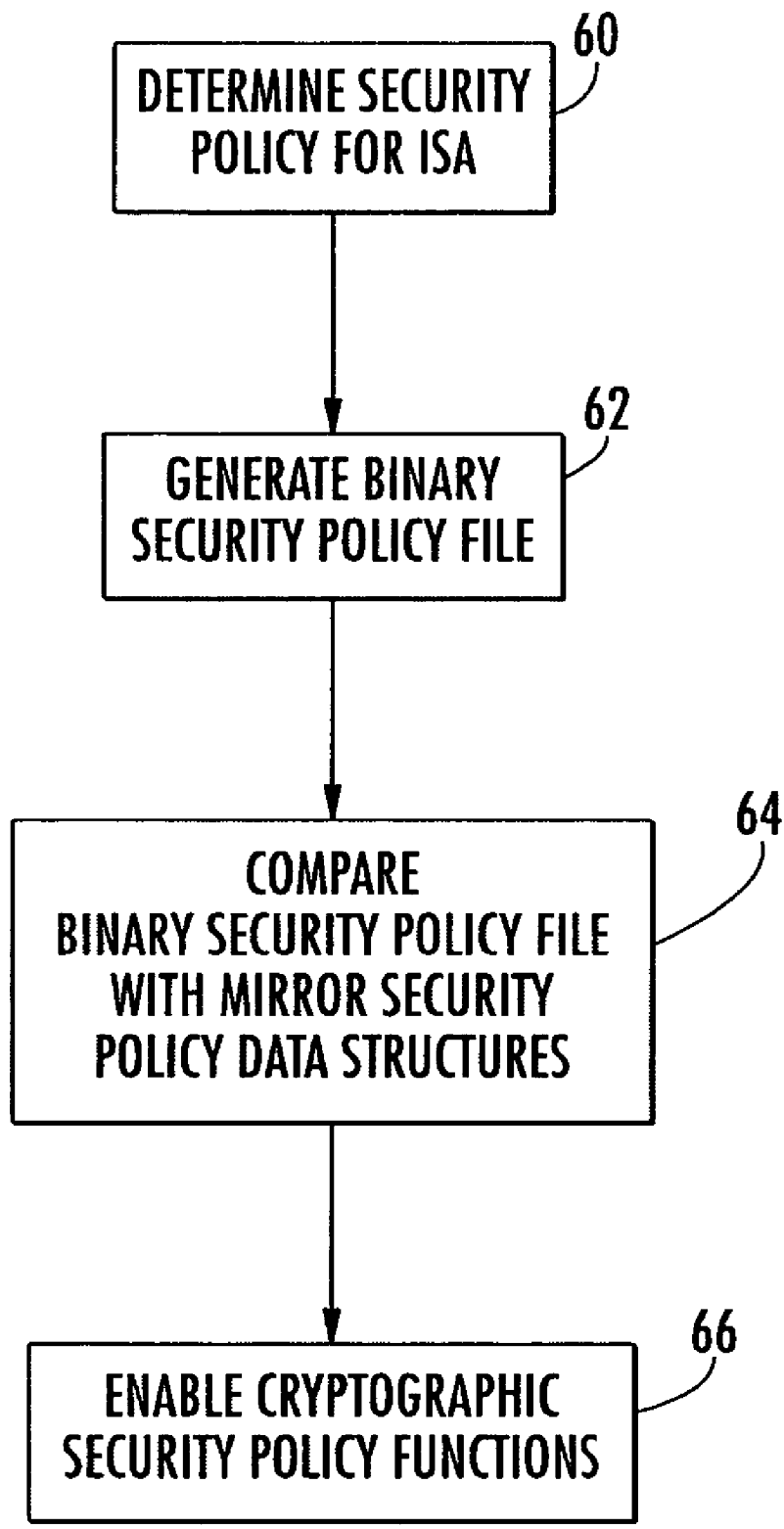
FIG. 3 is a high level flowchart showing the steps for determining a security policy of an implementation specific application of a programmable cryptography module in accordance with the present invention.

FIG. 3 is a high level flowchart showing that a security policy is first determined for an implementation specification application (Block 60). The binary security policy file is generated (Block 62) and compared with a mirror security policy data structure (Block 64). The cryptographic security policy functions are enabled when a positive comparison occurs (Block 66).

Figure 4:
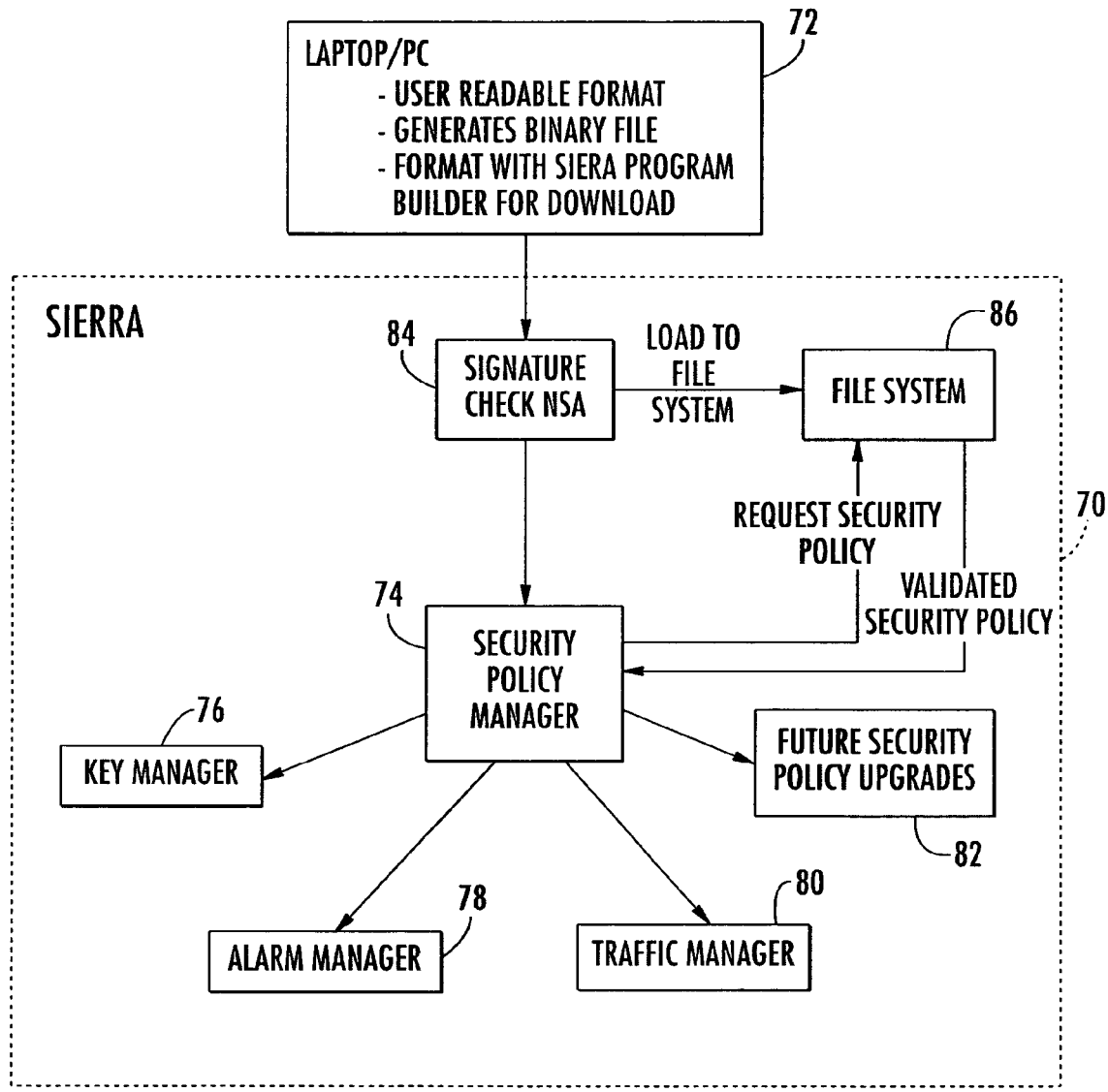
FIG. 4 is a block diagram showing basic components than can be used in the system and method of the present invention.
Figure 6:
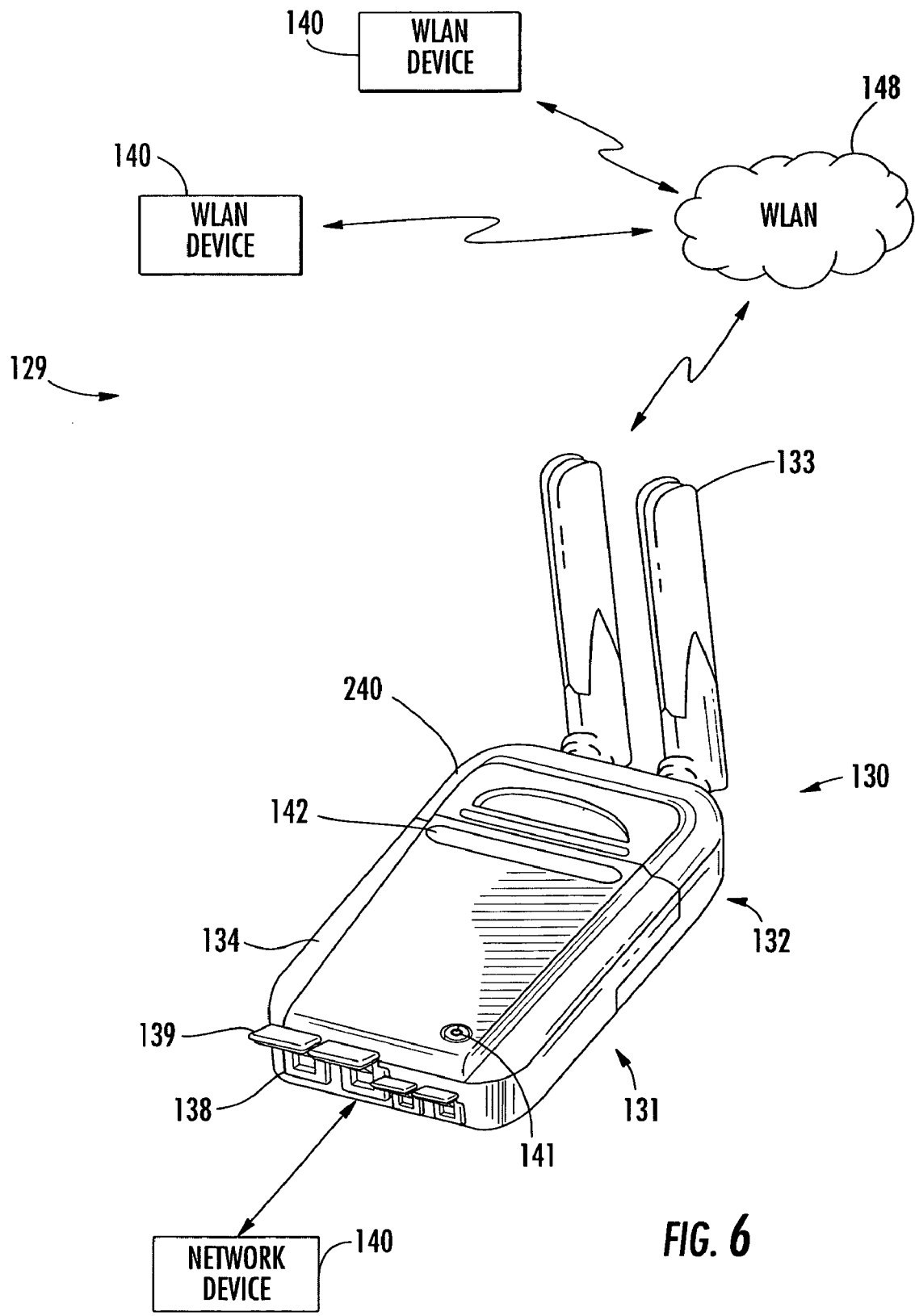
FIG. 6 is a perspective view of an example of a cryptographic device that can be programmed and updated using the system and method of the present invention.

FIG. 4 shows a programmable cryptography module 70, such as the Sierra module, that is operable with an external processor 72. A security policy is determined for an implementation specific application (ISA) as a set of rules governing cryptographic security policy functions of the security policy software module, also shown as a security policy manager 74. The processor 72 could be a laptop or other PC connected to the programmable cryptography module 70 and operable for performing different functions. The processor 72 has a user readable format and generates binary security policy files. These are formatted with appropriate programs as part of the programmable cryptography module and security policy software. A builder is downloaded into the programmable cryptography module. The security policy software module or manager is operable with a key manager 76, alarm manager 78, traffic manager 80 and future security policy upgrades 82. The processor 72 is operable with the programmable module 70 to perform a signature check for NSA security 84 and load the binary security policy file into a file system 86, which could be a flash memory of the programmable cryptography module.

FIG. 5 shows an object distribution interface 90 as a graphical user interface in which data can be input for generating a binary security policy file that includes a button 92a for generating tabs or a button 92b or for loading the last table. A series of tabs 94 can be depressed, including the illustrated modes tab. The tabs include a tab for authentication algorithms, integrity algorithms, key types, new values and alarm actions. A series of numerical indicia tabs 96 allow data entry using drop-down menu options, including algorithm, data rate, mode, maximum traffic header bypass size, data labeling, rekey capability and classification level, message volume measurement and data validation. SRC best combinations with short and long periods are also shown. The GUI shown in FIG. 5 is only one non-limiting example of an interface that can be used with the present invention.

The security policy object distribution system of the present invention is a four-part solution. It includes: (1) the object distribution interface 90, (2) a flash formatted binary file 86, (3) a security policy software module 70, and (4) signature of the flash formatted binary file (FIGS. 2-3).

The object distribution interface 90 is a Windows based software interface that is used to select the appropriate security policies for any given implementation specific application. The object distribution interface is also responsible for generating a binary file containing the security policy data, i.e., binary security policy file, which is formatted for loading into an onboard flash file system. This file is stored for later use by the cryptographic module code, for example, the Sierra module code in one non-limiting example. The flash formatting can be performed in the processor 72 or elsewhere using a proprietary Sierra program builder software such as developed by Harris Corporation of Melbourne, Fla.

The security policy software module 74 is a subset of the core Sierra module code that directly interacts with the binary security policy file stored in the flash file system, i.e., flash memory. The security policy software module code reads in the security policy from the file system, and based upon the data contained in the security policy, enables any specified security policy functions or other features of the cryptographic system. This allows for the use of one "all-inclusive" code package that can be ported to many implementation specific, and security policy specific applications.

The processor and module perform a signature on the entire code package one time (the entire code package refers to the package in which every security policy function or other feature is available and enabled). On every ISA thereafter, only the security policy binary file must be approved and signed. The present invention improves the current signature method because all of the source code will have already been approved and signed. There is no need to go through the entire signing process again. Instead, the security policy binary file can be approved and signed via email. The present invention eliminates the time and cost of the crypto-verification process for each application.

The object distribution interface 90 is formed as a Windows based Graphical User Interface (GUI) program created by using the visual basic programming language or similar language. The options available for user selection on the GUI are subdivided by cryptographic security policy functionality. Each subset of cryptographic security policy functionality is presented on a separate tab of the GUI (for example, as shown in FIG. 5). The object distribution interface software is easily upgradeable for future expansion of cryptographic security policy functionality, and can be expanded upon if a particular project requires more cryptographic security policy functions than are currently available.

Once the security policy has been determined for a particular implementation specific application (ISA), the graphical user interface of the object distribution interface is used to generate a hex formatted binary file representation of the security policy. The binary security policy file includes hexadecimal enumerations that represent the security policy data. The physical position of the data in this binary security policy file determines the interpretation of that data at the time that the binary security policy file is being parsed by the Sierra module code.

The binary security policy file generated by the graphical user interface of the object distribution interface program 90 must be formatted to be loaded into the flash file system 86 for the particular ISA. The binary security policy file formatting is achieved by running the binary file through software for a program builder, such as the proprietary Sierra Program Builder (SPB) developed by Harris Corporation. The program builder software adds a header and a checksum to the binary file to preserve/check the integrity of the file. The output of the program builder software would be a file generated with the file extension .smp. Terminal program software, for example, the proprietary Sierra terminal program (STP), is used to load the binary security policy file into the flash file system. The binary security policy file will not successfully load through the terminal program without successful validation of the header and the checksum.

The security policy software module is a subset of the module code, for example, the core Sierra module code that directly interacts with the binary security policy file that is stored in the flash file system. When the module comes out of a reset condition, and the initialization code of the Sierra module code executes, the file system will be reached in from the flash memory. When the binary security policy file is read from the file system, the data is overlaid onto security policy data structures. Hard coded in the security policy software module are a set of mirror security policy data enumerated structures that serve as a comparison limit for the various cryptographic security policy functions of the security policy.

At run time when an applicable cryptographic function is called, the corresponding security policy data structure obtained form the file system is parsed and compared with the hard coded mirror security policy limiting structure. When there is a violation of the security policy, the call to the cryptographic security policy function is bypassed and a security policy violation error is returned to the host or processor. When all security policy comparisons were successful, however, the module code proceeds to carry out the cryptographic security policy function. When no security policy has been loaded into the file system, the security policy software module's security policy structures default to the most limiting case in which no cryptographic security policy features are allowed.

The addition of the Security Policy Object Distribution System (SPODS) of the present invention to an integrated system of Sierra module implementation specific applications reduces the costs (in terms of employee time, labor and financial cost) of the signature process. The procedure for a system that uses the present invention requires a complete intensive signature process on the entire Sierra module code package, as if there were no security policy being imposed on it. Thus, the signature and cryptographic verification is performed on a code package that can potentially perform all cryptographic and secure capabilities available, limited only by the capabilities of the Sierra or other ASIC and the maximum cryptographic and secure capabilities of the code package. For each implementation specific application thereafter, the flash formatted binary security policy file consisting of the security policy for that particular ISA must be signed and verified.

The present invention reduces the process of imposing a new security policy for any implementation specific application. The result is less employee time and labor and less time to develop individual code packages with different security policies. The present invention also eases the ability for the user to create and sell upgrades to customers because the Sierra or other module code will have been completed prior to an upgrade request. A security policy upgrade would consist of a signed binary security policy file that enables the requested cryptographic upgrades.

Figure 7:
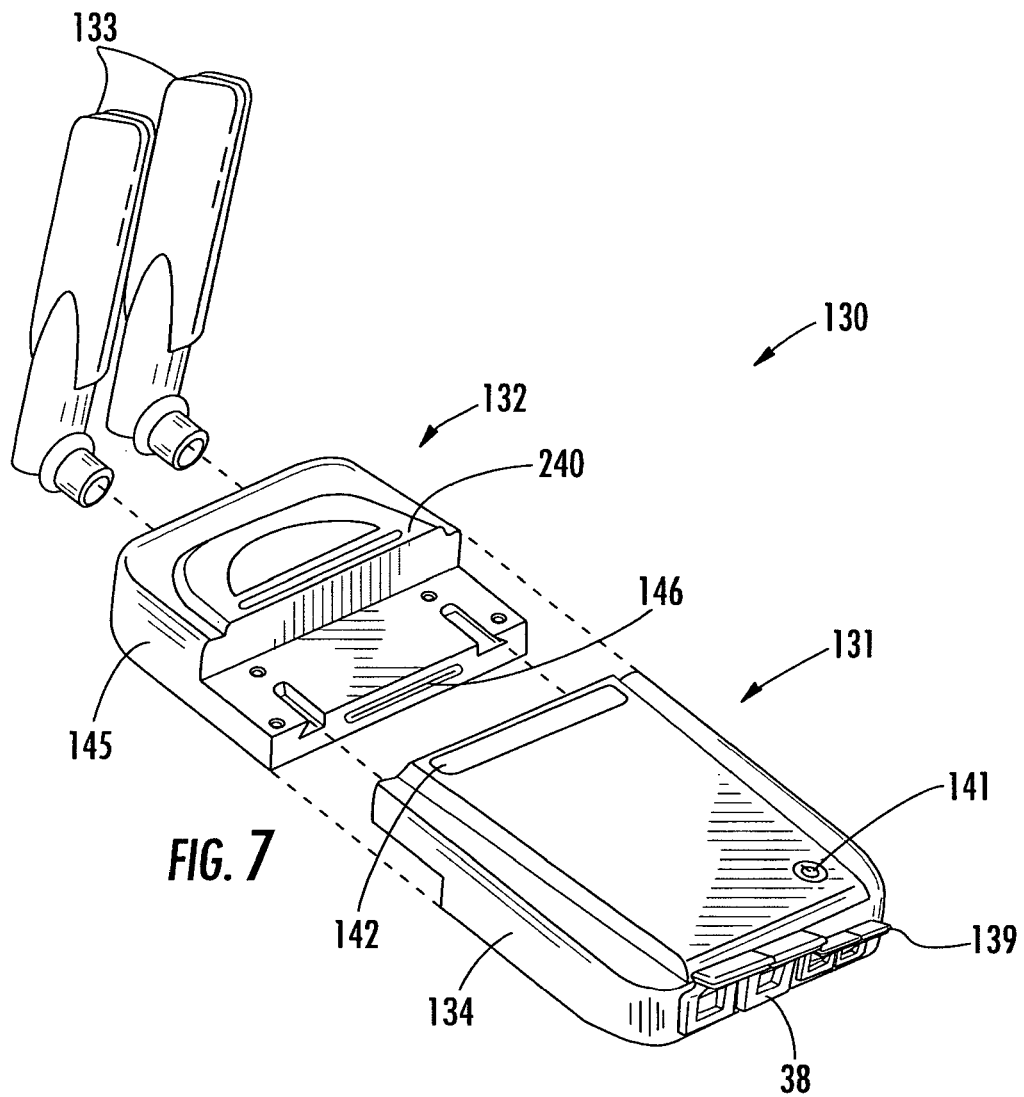
FIG. 7 is an exploded view of the cryptographic device of FIG. 6 illustrating various modules.
Figure 8:
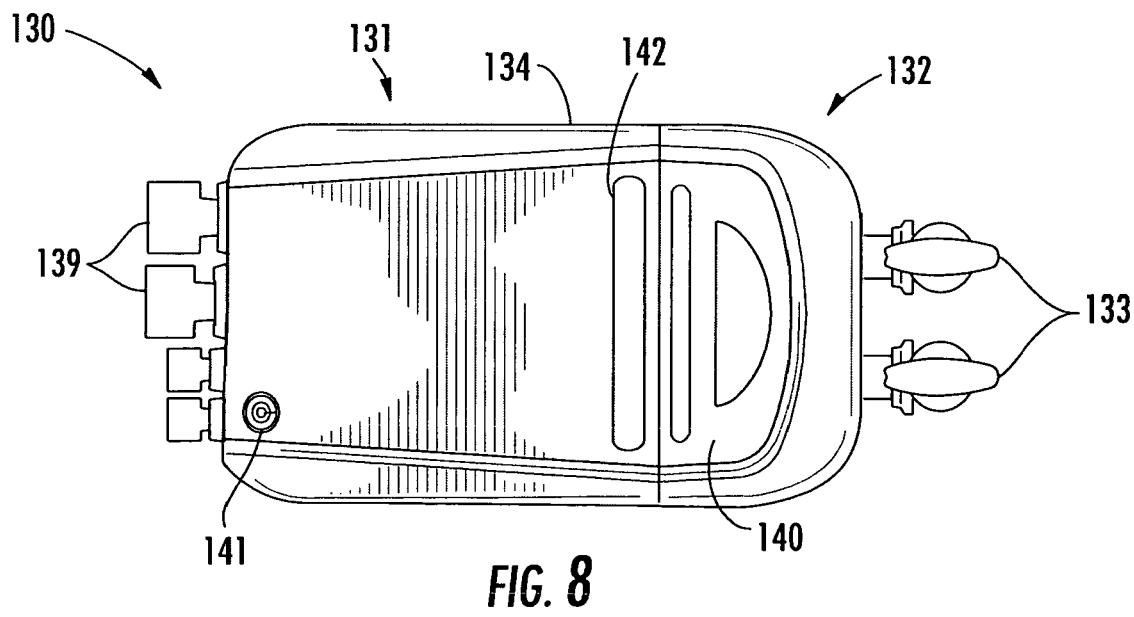
FIG. 8 is a top plan view of the cryptographic device of FIG. 6.

An example of a communication system that could include a cryptographic device that would be updated using the present invention is shown in FIGS. 6-14. This communication system 129 is set forth as an example of a type of system that can incorporate the encryption module and security policy object distribution system of the present invention. Further details of the cryptographic device are set forth in commonly assigned U.S. patent application Ser. Nos. 10/806,667 and 10/806,949, both filed Mar. 23, 2004, the disclosures which are hereby incorporated by reference in their entirety. A cryptographic device 130, a plurality of network devices 140, and a network such as a wireless Local Area Network (WLAN) 148 are illustrated. The cryptographic device 130 illustratively includes a cryptographic module 131 coupled to one of the devices 140 and a communications module 132. As shown in FIG. 7, the communications module 132 is removably coupled to the cryptographic module 131, as will be discussed further below. A plurality of interchangeable communications modules 132 may be connected to the cryptographic module 131 for communicating over different communications media. The communications module 132 is a WLAN module which includes dual tri-band antennas 133. The cryptographic device 130 can be used with numerous types of wired and wireless networks.

By including the appropriate chip sets/interface circuitry in different communications modules 132, each of these modules may interface with a different network medium (e.g., WLAN, wireline medium, fiber optic medium, etc.), yet all interface with the same cryptographic module 131. That is, the same cryptographic module 31 may be used for numerous network applications simply by coupling the appropriate communications module 132 thereto for the desired application. Examples of various types of communications modules 132 that may be used include WLAN modules, plain old telephone service (POTS) modules, tactical radio modules, E1/T1 modules, in-line network encryptor (INE) modules, a VersaModule Eurocard (VME) bus module, etc.

The modular design and ease of interchangeability not only provides a convenient way to quickly configure the cryptographic module 131 for different applications, but it may also be particularly useful for high level security applications such a Type 1, FIPS 140-2 level 4, etc.

The cryptographic module 131 includes all of the sensitive cryptographic circuitry and associated cryptographic algorithms/keys. The various communications modules 132 provide interfaces for different types of networks. That is, they do not process or transmit "red" (i.e., unencrypted) confidential/classified data, and thus they will likely not require the same certification scrutiny as the cryptographic module 131.

In particular, the cryptographic module 131 includes a first housing 134, a user network interface 135 carried by the first housing, a cryptographic processor 136 carried by the first housing and coupled to the user network interface, and a first inter-module connector 137 carried by the first housing and coupled to the cryptographic processor. The user network interface 135 may be an Ethernet physical layer (PHY) interface compatible with the IEEE 802.3 standard, for example, as will be appreciated by those skilled in the art. Various connectors 138 are also carried by the first housing 134 for coupling the cryptographic module 131 to different network devices 140 (e.g., personal computers (PCs), servers, portable communications devices, etc.).

By way of example, the connectors 138 may be wireline connectors, such as an RJ45 connector or fiber optic connectors, such as an LC fiber optic connector. Caps 139 may also be included for protecting the connectors 134. A power switch 141 and LED status indicators 142 (i.e., power, link state, fill, and alarm) are also carried by the first housing 134.

It should be noted that the term "user" is used with relation to the user network interface 135 simply to indicate that this interface is for the user network device side and not the communications network side of the cryptographic device 130. That is, "user" does not mean that the interface 135 is only for individual user devices such as PCs. Instead, the user network interface may be connected to a variety of different LAN devices (e.g., servers, bridges, access points, etc.), as noted above.

The communications module 132 illustratively includes a second housing 145, a second inter-module connector 146 carried by the second housing and removably mateable with the first connector 137 of the cryptographic module 131, and a network communications interface 147 carried by the second housing 145 and coupled to the second connector. In the present example, the network communications interface 147 includes a WLAN communication circuit (e.g., an 802.11 chip set) for cooperating with the antennas 133 to wirelessly communicate with a network (e.g., LAN) 148, as will be discussed further below. Yet, as noted above, the network communications interface 147 may be a wireline LAN communication circuit, a fiber optic LAN communication circuit, etc., for example.

The various circuit components of the cryptographic module 131 may be implemented in a cryptographic circuit card (CCA) 150, for example, as will be appreciated by those skilled in the art. The circuitry of the communications module 132 may similarly be implemented in a CCA 151. The cryptographic module 131 may also include a power CCA 152 carried by the first housing 134 and including power supply/ filtering circuitry 153 for powering the cryptographic processor 136, the user network interface 135, and the communications module 132.

The cryptographic processor 136 may include a host network processor 154 connected to the user network interface 135, and cryptography circuitry 155 connected to the host network processor. More particularly, the cryptography circuitry 155 illustratively includes an unencrypted (i.e., "red") data buffer 156 connected to the host network processor 154, a cryptography circuit 157 connected to the unencrypted data buffer, and an encrypted (i.e., "black") data buffer 158 connected between the cryptography circuit and the first connector 137.

By way of example, the unencrypted and encrypted data buffers may be first-in, first-out (FIFO) buffers implemented using field-programmable gate arrays (FPGAs), and the cryptography circuit 157 may be implemented in an application specific integrated circuit (ASIC). The cryptography ASIC that is particularly well suited is the Sierra (and Sierra II) device, but other suitable circuitry may be used as well.

The host network processor 154 illustratively includes a plurality of modules which may be implemented using hardware and/or software, as will be appreciated by those skilled in the art. Generally speaking, the host network processor 154 includes a first 802.3 medium access controller (MAC) controller 160 for interfacing the user network interface 135, a second 802.3 MAC controller 161 for interfacing the cryptographic processor 136 and network communications interface 147, as will be described further below, and a processor 162 coupled between the MAC controllers. The host network processor 154 and user network interface 135 may communicate via dedicated lines for Media Independent Interface (MII) communications, as will be discussed further below, and a management data input/output bus (FIGS. 11 and 13), for example.

More specifically, the processor 162 may include a hypertext transfer protocol (HTTP) server module 173, a simple network management protocol agent 163, a firewall/routing module 164, an over the air rekeying/over the network rekeying (OTAR/OTNR) module 165, and an over the air zeroization/over the network zeroization (OTAZ/OTNZ) module 166. Moreover, the processor 154 also illustratively includes a mode controller 167 for providing proper configuration based upon the particular mode or media with which the cryptographic module 131 is to operate (e.g., WLAN access point (AP) mode, ad-hoc mode, infrastructure mode, etc.). The mode controller 167 may also perform other configuration/monitoring functions, such as for service set identifiers (SSIDs), channel, transmission level, data rate, 802.11 band selection (i.e., a, b, g) depending upon the particular application the cryptographic module 131 is to be used for, as will be appreciated by those skilled in the art. Additional modules such as an Internet protocol (IP) security protocol (IPSec)/high-assurance IP encryption (HAIPE) module 168, a key management module 169, and/or a device discovery module 170 may also be included depending upon the given implementation, as will also be appreciated by those skilled in the art. The cryptographic module also preferably includes respective memory devices 171, 172 for the host network processor 154 and cryptography circuit 157.

The power circuitry 153 illustratively includes external power interface (I/F) circuitry 175, which may be connected to a DC source (e.g., battery), a wall wart AC adapter, an Ethernet power source, etc. Of course, it will be appreciated that other power sources may be used in different implementations. The power circuitry 153 further illustratively includes cryptographic/communications module power isolation/filtering circuitry 176 coupled to the external power I/F circuitry 175. A cryptographic module power circuit 177 and a communications module power circuit 178 are coupled to the power isolation/filtering circuitry 176 for respectively supplying the cryptographic and communications modules 131, 132. Further, a data filter/electrostatic discharge (ESD) protection circuit 179 is included for filtering signals communicated between the cryptographic module 131 and communications module 132, as will be appreciated by those skilled in the art.

The cryptographic module 131 also illustratively includes a tamper circuit 180 for disabling the cryptography circuit 157 based upon tampering with the first housing 134. By way of example, the tamper circuit 180 preferably includes one or more conductors substantially surrounding the cryptography circuit 157 so that the cryptographic processor is disabled based upon a break in any one of the conductors.

More particularly, the conductors may be relatively thin printed circuit traces printed on the inside of the first housing 134 and attached to the cryptographic processor 136. Since the conductors substantially surround the cryptographic processor 136 (or some portion thereof), if someone attempts to drill through the first housing 134 to access the cryptographic processor then one or more of the printed traces will be broken. The same holds true if someone opens the first housing, as the traces will be pulled away from the cryptographic processor 136 also causing breaks therein.

In either event, the open circuit condition resulting from the broken conductor(s) causes power to a cryptographic power interface circuit 181 to be disrupted to be discontinued. That is, power from a dedicated encryption algorithm/secret key battery 182 is prohibited from flowing to the cryptographic power interface circuit 181 via the cryptographic module power circuitry 177. As a result, the algorithm and secret key, which are preferably stored in a volatile memory, are permanently and instantly erased so that they cannot be discovered by malicious individuals or organizations. The tamper circuit 180 may thus provide tamper protection from all angles, if desired.

As noted above, the cryptography circuit 157 implements a desired encryption algorithm to provide a predetermined security level (e.g., Type 1, FIPS 140-2 levels 1 through 4, etc.). By way of example, Advanced Encryption Standard (AES), Baton, or Medley encryption algorithms may be used to provide such high level security. Of course, other high level security algorithms known to those skilled in the art may be used as well.

The cryptography circuitry 155 also illustratively includes a plurality of modules which may be implemented using hardware and/or software. The unencrypted data buffer (i.e., red FPGA) 156 illustratively includes a host interface/FIFO control module 190 for communicating with the host network processor 154 via the MII protocol, and traffic and command (CMD) FIFOs 191, 192 receiving outputs of the host interface/FIFO control module. It should be noted that various data paths are labeled as "red" and/or "black" to indicate whether they convey unencrypted or encrypted data, respectively, or both.

The output of the traffic FIFO 191 is connected to a buffer 193, which is connected to a first high speed parallel interface 194 of the cryptographic circuit 157. The output of the command FIFO 192 is connected to a first external bus interface unit (EBIU) 206 of the cryptographic circuit 157. This EBIU 206 is also connected to control registers 195 and a multiplexer 196. Another input of the multiplexer 196 is connected to the output of a second high speed parallel interface 197 of the cryptographic circuit 157. The output of the multiplexer 196 is passed to a cyclic redundancy check module 198, the output of which is passed through an output FIFO 200 back to the host interface/FIFO control module 190.

The first high speed parallel interface 194 of the cryptography circuit 157 has a respective word counter 201 associated therewith. A cryptographic processing module 202 of the cryptography circuit 157 interfaces the first and second high speed parallel interfaces 194, 197 and one or more cryptographic engine modules 203 via a bus controller 204. The cryptographic processing module 202 also communicates with a fill circuit 205 for the loading of cryptographic keys. The EBIU 206 also interfaces the cryptographic processing module 202 with the memory 172. A second EBIU 207 interfaces the cryptographic processing module 202 with control registers 210 and a multiplexer 211 of the encrypted data buffer (i.e., black FPGA) 158. The signal path between the second EBIU 207 and the multiplexer 211 provides a command signal path.

Various components of the host network processor 154, red FPGA 156, cryptographic circuit 157, and black FPGA 158 also communicate via one or more general purpose input/output (GPIO) busses as shown, as will be appreciated by those skilled in the art. Additional circuitry 212 may also be coupled to the cryptography circuit 157 for over/undervoltage detection, temperature detection, and/or panic zeroizing as required for a particular implementation, as will also be appreciated by those skilled in the art.

An output of the second high speed parallel interface 197 is passed via a buffer 213 to an input interface 214 which includes protection gating to prohibit red data from entering the black FPGA 158. The output of the input interface 214 is connected to a second input of the multiplexer 211 defining a traffic (i.e., data) path thereto. The output of the multiplexer 211 is provided to a cyclic redundancy check module 215, the output of which is provided to an output FIFO 217. An output of the MAC interface/FIFO control module 218 is provided to the input of the traffic FIFO 216. The output of the traffic FIFO 216 is passed via a buffer 220 back to the input of the first high speed parallel interface 194 of the cryptographic circuit 157, and the output of the output FIFO 217 is connected to the MAC interface/FIFO control module 218, which communicates with the communications module 132, as will be discussed further below.

Figure 10:
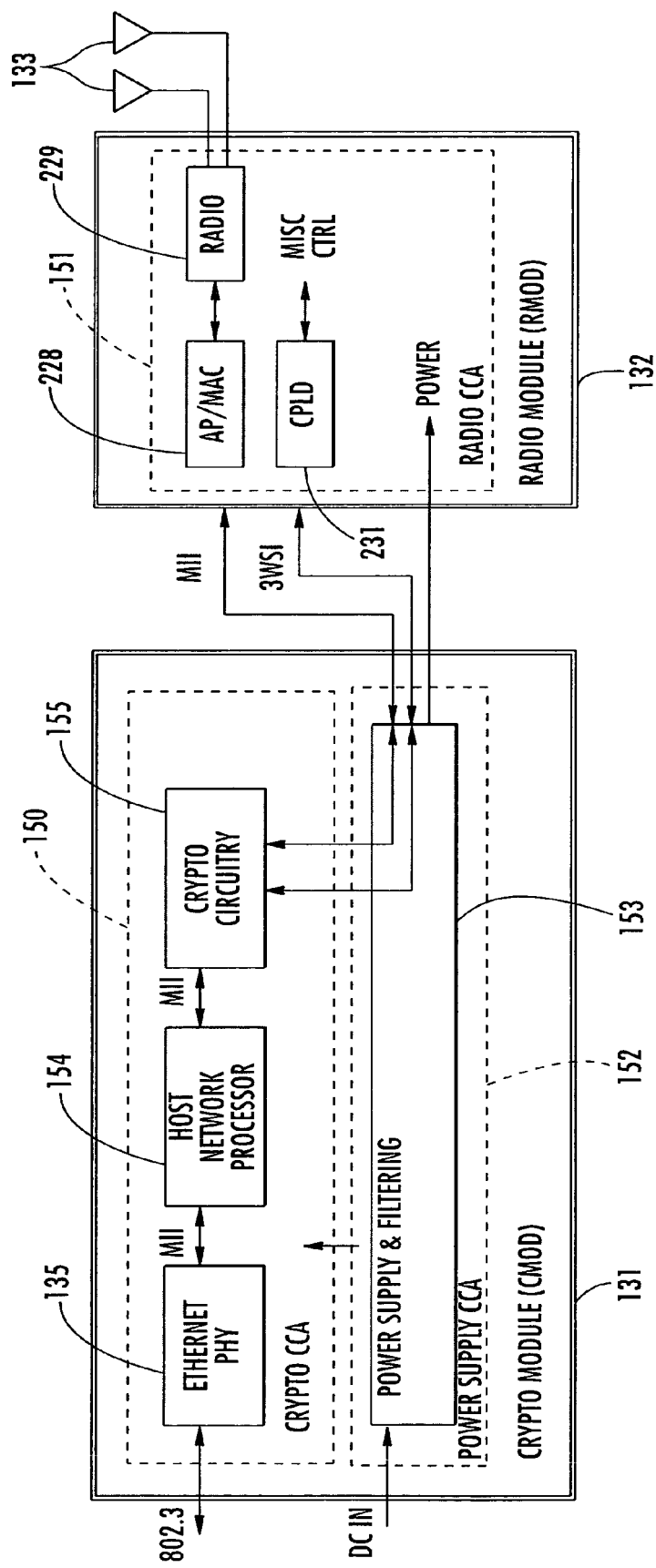
Figure 11:
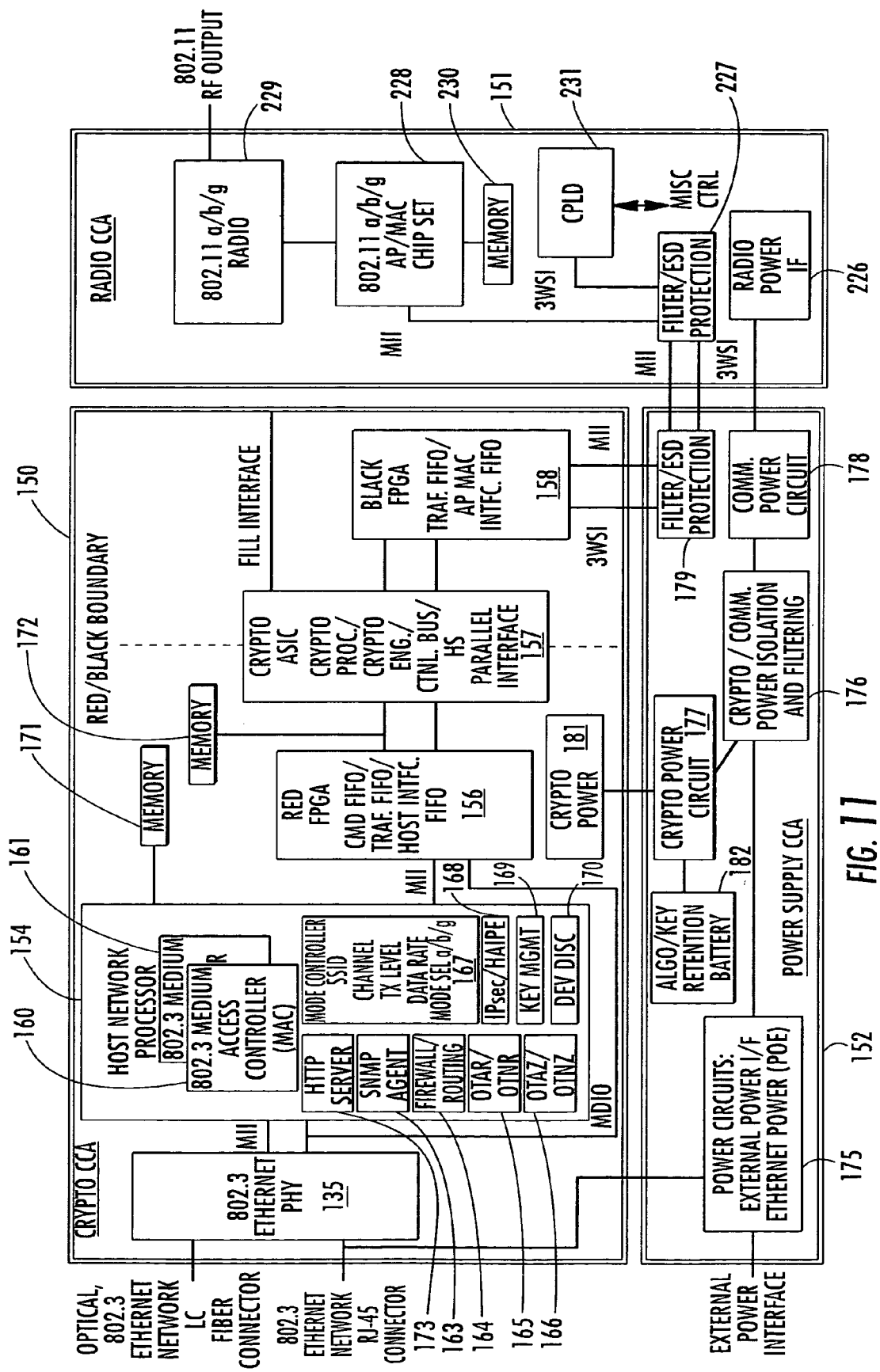
Figure 12:
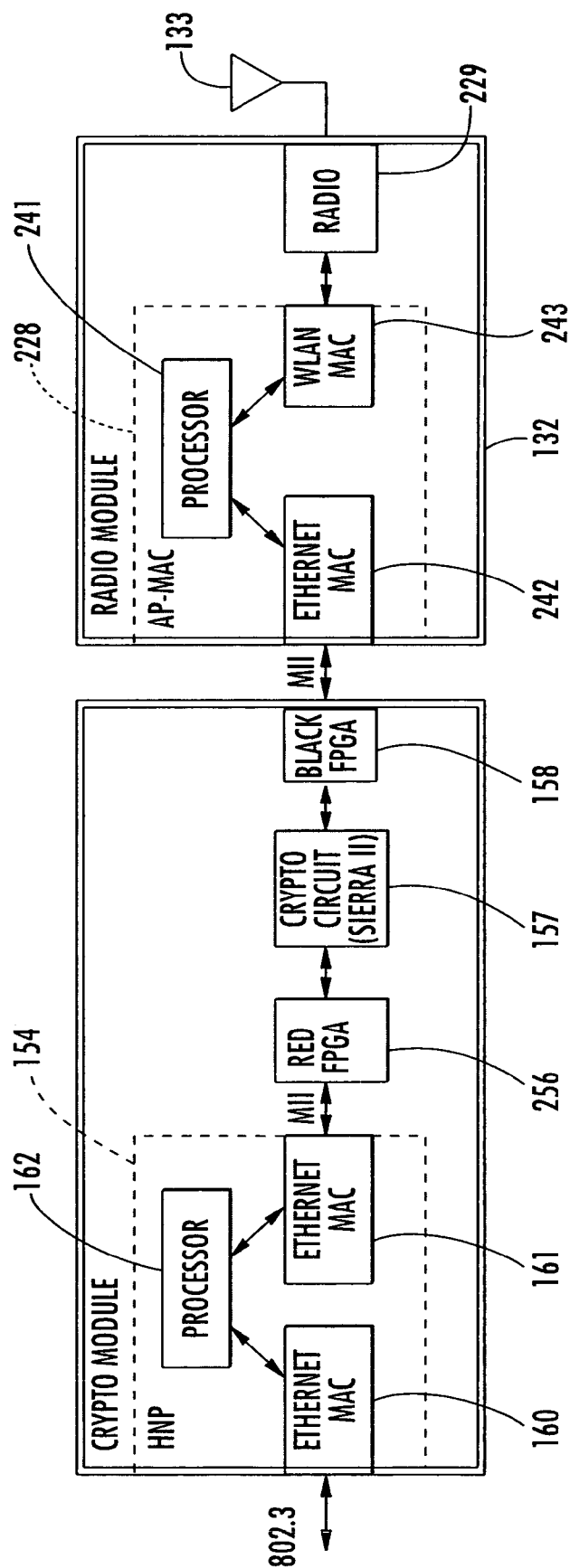
Figure 13:
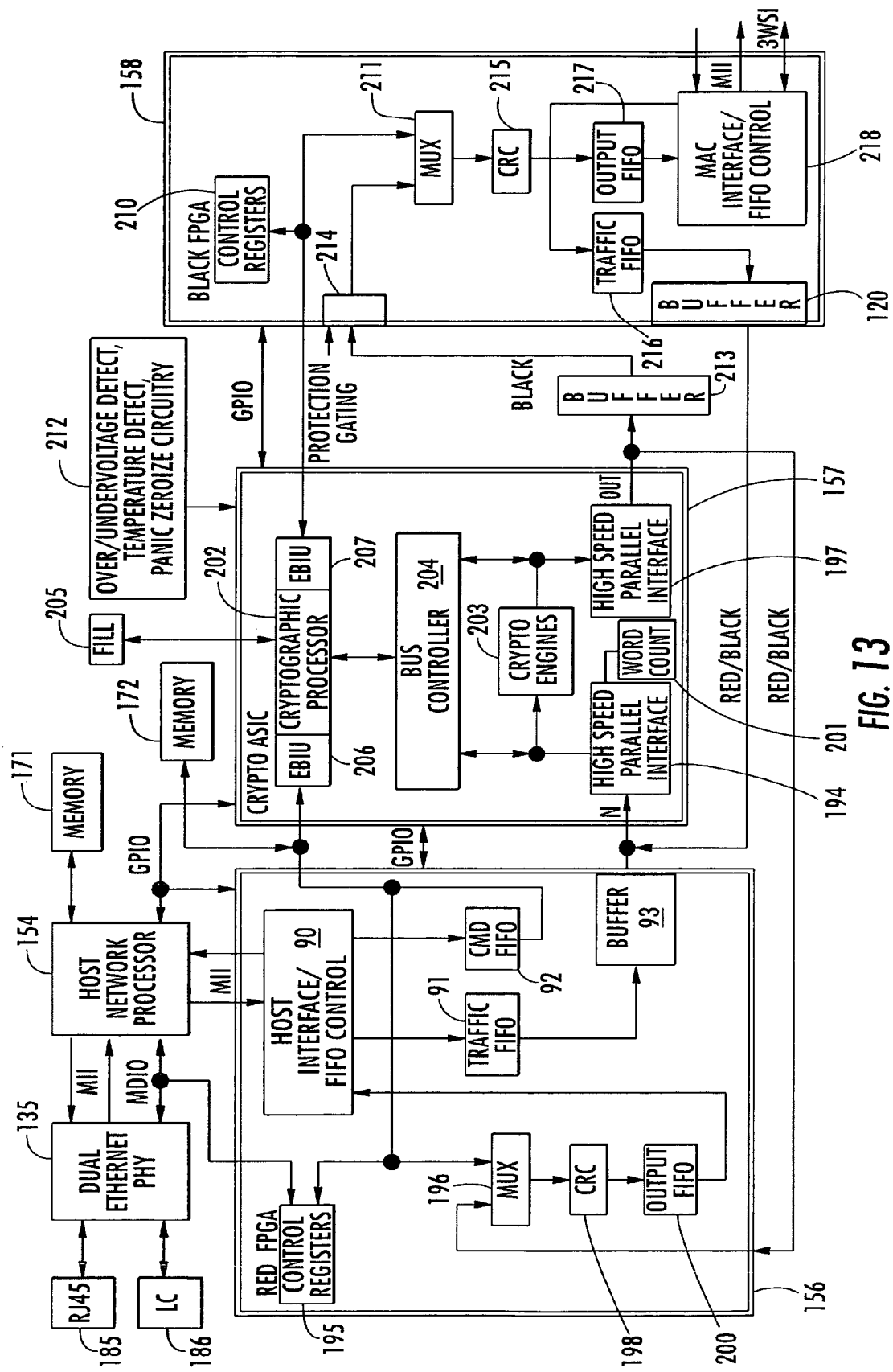

The various circuitry of the communication module 132 will now be described in further detail with particular reference to FIGS. 10-12. As noted above, the various circuitry of the communications module 132 is implemented in the communications CCA 151. In particular, the communications (or radio in the present WLAN example) CCA 151 illustratively includes a power interface 226 for cooperating with the communications power circuit 178 to supply the various communications circuitry components. Additional filter/ESD circuitry 227 may also be included in the signal path from the cryptographic module 131, if desired.

More particularly, the signal path between the cryptographic module 131 and communications module 132 includes a plurality of lines for MII communications, as well as a three-wire serial interface (3WSI). Generally speaking, the MII lines are for transferring encrypted data between the cryptographic module 131 and the communications module 132, and the three wire serial interface is for status/configuration operations of the communications module, as will be discussed further below.

More particularly, the MII lines pass through the filter/ESD circuitry 227 to the network communications interface 147. In the present WLAN example, the network communications interface 147 includes an 802.11 a/b/g AP/MAC chip set 228 connected to the MII lines, and an associated 802.11 a/b/g radio 229 connected to the 802.11 a/b/g AP/MAC chip set for wirelessly communicating with a WLAN. One or more memories 230 may be provided for the 802.11 a/b/g AP/MAC chip set 228. The 802.11 a/b/g AP/MAC chip set 228 illustratively includes a processing module 241, an Ethernet MAC module 242 for communicating with the cryptographic module 131, and a WLAN MAC module 243 for performing the appropriate 802.11 WLAN interface and processing operations, as will be appreciated by those skilled in the art.

The communications CCA 151 also illustratively includes a logic device 231, such as a complex programmable logic device (CPLD), which is connected to the above-noted three wire serial interface. Generally speaking, the CPLD 231 cooperates with the cryptographic processor 136 to detect, status, and configure different types of communications modules 132. More particularly, the host network processor 154 polls the CPLD 231 to determine what type of communications module 132 is connected to the cryptographic module 131 (i.e., WLAN, wireline, fiber optic, etc.), as well as its operational status, as will be appreciated by those skilled in the art. The CPLD 231 also permits the host network processor 154 to configure the network communications interface 147 for operation in a given application, as will also be appreciated by those skilled in the art.

Figure 14:
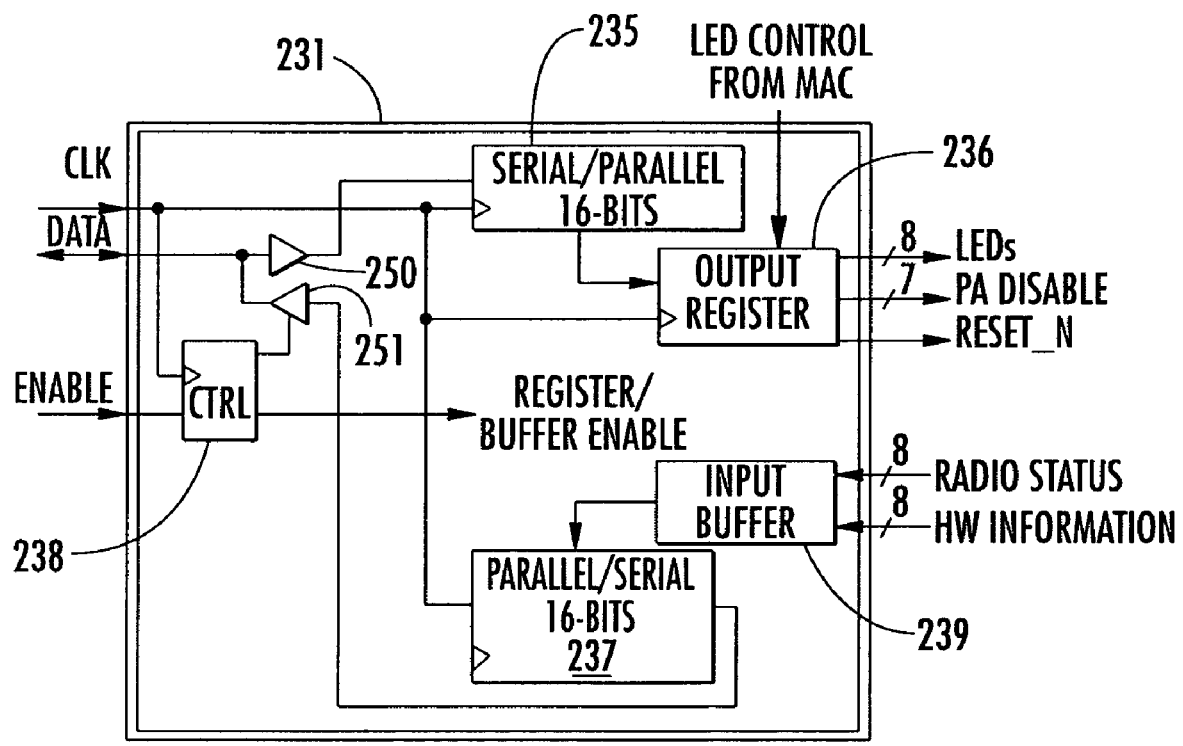

Referring additionally to FIG. 14, the three lines of the three wire serial interface respectively carry clock signals, data signals, and enable signals between the cryptographic and communications modules 131, 132. The clock signal is provided to a sixteen bit (although other sizes may also be used) serial to parallel data converter 235, an output register 236, a sixteen bit parallel to serial data converter 237, and control logic 238. More particularly, control data coming from the cryptographic processor 136 via the data line is written to the serial to parallel data converter 235 to be output by the output register 236.

More particularly, the communications module 232 may further include one or more status indicators 240 (e.g., light emitting diodes (LEDs)) carried by the second housing 145 for indicating operational mode, band, or other appropriate status information. The LEDs 240 receive multiple bits (e.g., eight) from the output register 236. Another set of bits (e.g., seven bits) from the register 236 are for enabling/disabling the communication module transmission circuitry (e.g., radio power amplifiers (PA)), and the remaining bits of the sixteen bit output is for providing a reset signal for the communications module 132.

The input buffer 239 receives multiple bits (e.g., eight) of status (e.g., radio status for a WLAN implementation) information and multiple bits (e.g., eight) of hardware information from the 802.11 chip set 228 (or other network communications interfaces in other embodiments) to pass along to the cryptographic processor 136 via the parallel to serial data converter 237 and the data line of the three wire serial bus. Read and write data buffers 250, 251 may also be connected to the data line, if desired. Furthermore, the control circuitry 238 also receives the enable signal and enables the output register 236 and input buffer 239.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for creating a security application, which comprises:
   a programmable cryptography module comprising module code for operating the programmable cryptography module, a file system that stores modes and algorithms concerning operation of the programmable cryptography module and receives a binary security policy file that is formatted to load a security policy as code approved by a governmental authority, and a security policy software module as a subset of the module code that enables modes and algorithms per a security policy to be read from the file system, wherein the security policy software module further comprises mirror security policy data structures that serve as a comparison limit for various cryptographic security policy functions of the security policy, said module further comprising a signature check module; and
   a processor external from the programmable cryptography module for determining a security policy for an implementation specific application as a set of rules governing cryptographic security policy functions, said processor being operative for generating a binary security policy file representative of the security policy and comparing the binary security policy file with the mirror security policy data structures to determine a violation of the security policy or successful comparison and further comprising an object distribution interface through which a user inputs data for generating the binary security policy file, wherein the processor is operable with the signature check module at the programmable cryptography module for performing a signature check only one time on the code corresponding to the binary security policy file as approved by the governmental authority such that the code can be ported to security policy specific applications without reapproval of the code.

2. A system according to claim 1, wherein said object distribution interface comprises a graphical user interface.

3. A system according to claim 2, wherein said graphical user interface comprises selection tabs for selecting different cryptographic security policy functions.

4. A system according to claim 1, wherein a cryptographic security policy function is enabled after a successful comparison.

5. A system according to claim 1, wherein a cryptographic security policy function is bypassed if a violation of the security policy has occurred.

6. A system according to claim 1, wherein said processor is operative for loading a binary security policy file into a system memory for an implementation specific application.

7. A system according to claim 1, wherein said processor is operative for overlaying any data from the binary security policy file onto mirror security policy data structures.

8. A system according to claim 1, wherein said binary security policy file comprises hexadecimal enumerations that represent data within the binary security policy file.

9. A system according to claim 1, wherein said binary security policy file comprises data in which the physical position of data within the binary security policy file is used for interpreting data for the security policy.

10. A system according to claim 9, wherein said data within said binary security policy file comprises parsed data.

11. A system according to claim 1, wherein said binary security policy file is formatted to be loaded within a flash file memory of the programmable cryptography module.

12. A system according to claim 1, wherein said binary security policy file comprises a header and checksum.

13. A system according to claim 12, wherein said processor is operative for validating said header and checksum before loading the binary security policy file into any memory.

14. A system of creating a security application, which comprises:
   a programmable cryptography module comprising module code for operating the programmable cryptography module, a file system that stores modes and algorithms concerning operation of the programmable cryptography module and receives a binary security policy file that is formatted to load a security policy as code approved by a governmental authority, and a cryptographic system and cryptographic security policy software module that are enabled for the cryptographic system as a subset of the module code that enables modes and algorithms per a security policy to be read from the file system, wherein the security policy software module further comprises mirror security policy data structures that serve as a comparison limit for various cryptographic security policy functions of the security policy, said module further comprising a signature check module;
   a processor external from the programmable cryptography module for performing a signature on the cryptographic system, said processor operative for generating a binary security policy file representative of a security policy for an implementation specific application as a set of rules governing cryptographic security policy functions of the programmable cryptography module, said processor being operative for approving a security policy binary file without performing again a signature on the cryptographic system and further comprising an object distribution interface through which a user inputs data for generating the binary security policy file, wherein the processor is operable with the signature check module at the programmable cryptography module for performing a signature check only one time on the code corresponding to the binary security policy file as approved by the governmental authority such that the code can be ported to security policy specific applications without reapproval of the code.

15. A system according to claim 14, wherein said graphical user interface comprises selection tabs for selecting a different cryptographic security policy functions.

16. A system according to claim 15, wherein a cryptographic security policy function is enabled after a successful comparison.

17. A system according to claim 14, wherein a cryptographic security policy function is bypassed if a violation of the security policy has occurred.

18. A system according to claim 14, wherein said processor is operative for loading a binary security policy file into a system memory for an implementation specific application.

19. A system according to claim 14, wherein said processor is operative for overlaying any data from the binary security policy file onto mirror security policy data structures.

20. A system according to claim 14, wherein said binary security policy file comprises hexadecimal enumerations that represent data within the binary security policy file.

21. A system according to claim 14, wherein said binary security policy file comprises data in which the physical position of data within the binary security policy file is used for interpreting data for the security policy.

22. A system according to claim 21, wherein the data within said binary security policy file comprises parsed data.

23. A system according to claim 14, wherein said binary security policy file is formatted to be loaded within a flash file memory of the programmable cryptography module.

24. A system according to claim 23, wherein said binary security policy file comprises a header and checksum.

25. A system according to claim 24, wherein said processor is operative for validating said header and checksum before loading the binary security policy file any memory.

26. A method for creating a security application, which comprises:
- determining a security policy for an implementation specific application as a set of rules governing cryptographic security policy functions of a programmable cryptography module comprising module code for operating the programmable cryptography module, a file system that stores modes and algorithms concerning operation of the programmable cryptography module and receives a binary security policy file that is formatted to load a security policy as code approved by a governmental authority, and wherein the programmable cryptography module includes a security policy software module as a subset of the module code that enables modes and algorithms per a security policy to be read from the file system, wherein the security policy software module further comprises and mirror security policy data structures that serve as a comparison limit for various cryptographic security policy functions of the security policy, said module further comprising a signature check module;
- generating a binary security policy file representative of a security policy from a processor external to the programmable cryptography module; and
- comparing the binary security policy file with the mirror security policy data structures to determine a violation of the security policy or successful comparison and providing an object distribution interface through which a user inputs data for generating the binary security policy file, wherein the processor is operable with the signature check module at the programmable cryptography module for performing a signature check only one time on the code corresponding to the binary security policy file as approved by the governmental authority such that the code can be ported to security policy specific applications without reapproval of the code.

27. A method according to claim 26, which comprises inputting data through a graphical user interface.

28. A method according to claim 27, which comprises selecting a different cryptographic security policy function by selecting different tabs on the graphical user interface.

29. A method according to claim 27, which comprises loading the binary security policy file into a system memory for an implementation specific application.

30. A method according to claim 26, which comprises enabling a cryptographic security policy function after a successful comparison.

31. A method according to claim 26, which comprises bypassing a cryptographic security policy function if a violation of the security policy occurs.

32. A method according to claim 26, which comprises overlaying any data from the binary security policy file onto the mirror security policy data structure.

33. A method according to claim 26, which comprises generating hexadecimal enumerations that represent data within a binary security policy file.

34. A method according to claim 26, which comprises interpreting the security policy by the physical position of data within the binary security policy file.

35. A method according to claim 34, which comprises parsing the data.

36. A method according to claim 26, which comprises formatting the binary security policy file to be loaded within a memory of the programmable cryptography module.

37. A method according to claim 26, which comprises formatting the binary security policy file by adding a header and checksum.

38. A method according to claim 37, which comprises validating the header and checksum before loading the binary security policy file into any memory.

39. A method for creating a security application, which comprises:
- enabling cryptographic security policy functions for a cryptographic system within a programmable cryptography module comprising module code for operating the programmable cryptography module, a file system that stores modes and algorithms concerning operation of the programmable cryptography module and receives a binary security policy file that is formatted to load a security policy as code approved by a governmental authority, and which includes a security policy software module as a subset of the module code that enables modes and algorithms per a security policy to be read from the file system, wherein the security policy software module further comprises mirror security policy data structures that serve as a comparison limit for various cryptographic security policy functions of the security policy, said module further comprising a signature check module;
- performing a signature on the cryptographic system;
- generating a binary security policy file representative of a security policy for an implementation specific application as a set of rules governing cryptographic security policy functions of the programmable cryptography module; and
- approving a security policy binary file without performing again a signature on the cryptographic system and providing an object distribution interface through which a user inputs data for generating the binary security policy file, wherein the processor is operable with the signature check module at the programmable cryptography module for performing a signature check only one time on the code corresponding to the binary security policy file as approved by the governmental authority such that the code can be ported to security policy specific applications without reapproval of the code.

40. A method according to claim 39, which comprises comparing the binary security policy files with the mirror security policy data structures.

41. A method according to claim 39, which comprises inputting the data through a graphical user interface.

42. A method according to claim 41, which comprises selecting a different cryptographic security policy function by selecting different tabs on the graphical user interface.

43. A method according to claim 39, which comprises enabling a cryptographic security policy function after a successful comparison.

44. A method according to claim 39, which comprises bypassing a cryptographic security policy function if a violation of the security policy occurs.

45. A method according to claim 39, which comprises loading the binary security policy file into a system memory for an implementation specific application.

46. A method according to claim 39, which comprises overlaying any data from the binary security policy file onto the mirror security policy data structure.

47. A method according to claim 39, which comprises generating hexadecimal enumerations that represent data within a binary security policy file.

48. A method according to claim 39, which comprises interpreting the security policy by the physical position of data within the binary security policy file.

49. A method according to claim 48, which comprises parsing the data.

50. A method according to claim 49, which comprises formatting the binary security policy file to be loaded within a flash memory of the programmable cryptography module.

51. A method according to claim 50, which comprises formatting the binary file by adding a header and checksum.

52. A method according to claim 51, which comprises validating the header and checksum before loading the binary security policy file into any flash memory.

* * * * *